United States Patent [19]

McManus

[11] Patent Number: 5,678,404
[45] Date of Patent: Oct. 21, 1997

[54] INTERNAL COMBUSTION ENGINE VARIABLE TUNED EXHAUST SYSTEM

[76] Inventor: Peter John McManus, 19 Cashel Crescent, Killarney Heights, NSW 2087, Australia

[21] Appl. No.: 307,791

[22] PCT Filed: Apr. 5, 1993

[86] PCT No.: PCT/AU93/00145

§ 371 Date: Sep. 30, 1994

§ 102(e) Date: Sep. 30, 1994

[87] PCT Pub. No.: WO93/20341

PCT Pub. Date: Oct. 14, 1993

[30] Foreign Application Priority Data

Apr. 6, 1992 [AU] Australia .................. PL 1735

[51] Int. Cl.$^6$ .............................................. F02B 27/06
[52] U.S. Cl. .................................... 60/313; 60/324
[58] Field of Search ......................... 60/312, 313, 314, 60/324

[56] References Cited

U.S. PATENT DOCUMENTS

| | | | |
|---|---|---|---|
| 2,110,986 | 3/1938 | Kadenacy | 60/324 |
| 3,703,937 | 11/1972 | Tenney | 60/314 |
| 3,969,895 | 7/1976 | Krizman | 60/324 |
| 4,046,219 | 9/1977 | Shaikh | 181/250 |
| 4,941,319 | 7/1990 | Yamamoto | 60/314 |
| 4,999,999 | 3/1991 | Takahashi | 60/313 |

FOREIGN PATENT DOCUMENTS

| | | | |
|---|---|---|---|
| 293171 | 8/1991 | Germany | 60/314 |
| 88817 | 5/1985 | Japan | 60/324 |
| 178917 | 9/1985 | Japan | 60/314 |
| 1029614 | 1/1989 | Japan | 60/312 |
| 1313621 | 12/1989 | Japan | 60/324 |
| 1716184 | 2/1992 | Russian Federation | 60/313 |

*Primary Examiner*—Douglas Hart
*Attorney, Agent, or Firm*—Richard C. Litman

[57] ABSTRACT

An exhaust system for an internal combustion engine having an exhaust port and an exhaust chamber communicating between the ports includes a variable dimension element in the exhaust chamber adapted to vary an effective dimension of the exhaust chamber during operation of the engine.

7 Claims, 2 Drawing Sheets

INTERNAL COMBUSTION ENGINE VARIABLE TUNED EXHAUST SYSTEM

TECHNICAL FIELD

This invention relates to improvements in internal combustion engines. In particular, this invention relates to exhaust systems for internal combustion engines and to internal combustion engines incorporating such exhaust systems, as well as to a method of operating such exhaust systems.

BACKGROUND OF THE INVENTION AND PRIOR ART

A conventional internal combustion engine repeats a cycle of actions in either two or four movements of a piston. The cylinder in a two-stroke engine, for example, has a transfer port and an exhaust port, each of which is opened and closed by reciprocation of the piston. The cylinder in a four-stroke engine, for example, has, instead of the transfer port and the exhaust port, an inlet valve and an outlet valve, each of which is also opened and closed by reciprocation of the piston.

For the sake of simplicity, that stroke of the piston, which results in the exhaust products being scavenged from the cylinder, will hereinafter be referred to as the exhaust stroke. Further, those means through which the fuel mixture enters the cylinder, being the transfer port of a two-stroke engine or the inlet valve of a four-stroke engine, for example, will hereinafter be referred to as the transfer port.

Furthermore, those means through which the exhaust products leave the cylinder and enter the exhaust system, being the exhaust port of a two-stroke engine or the outlet valve of a four-stroke engine, for example, will hereinafter be referred to as the exhaust port. It should be noted that the exhaust port may further include one or more header pipes.

After the fuel mixture has entered the cylinder through the transfer port and has been compressed and ignited, the exhaust products are scavenged from the cylinder during the exhaust stroke, through the exhaust port.

It is known that the tuning or adjustment of the exhaust system of an engine can affect engine performance. It is possible to tune an exhaust system with regard to the opening of the exhaust port to enhance engine performance.

For example, Australian Patent No. 584087 describes the tuning of an exhaust system of a two-stroke engine in order to establish a low pressure at the exhaust port, when the exhaust port is open and before the transfer port is closed, and a higher pressure at the exhaust port, after the transfer port is closed and before the exhaust port is closed.

The purpose of establishing the low pressure at the exhaust port before the transfer port is closed is to enhance scavenging of the exhaust products from the cylinder. The purpose of establishing the higher pressure at the exhaust port after the transfer port is closed is to minimise loss of fresh fuel mixture from the cylinder. Tuning in this manner can produce a "super-charging" effect, giving both greater engine power and improved fuel economy.

In Australian Patent No. 584097, the tuning of the exhaust port is said to be achieved by controlling the temperature of the gas in the exhaust system.

In tuning the exhaust system of a four-stroke engine, a "super-charging" effect may be achieved during valve overlap time when scavenging of the exhaust products from the cylinder is enhanced by negative pressure created at the exhaust port.

It has now been found that excellent tuning of the exhaust system of an engine may be achieved by providing an exhaust chamber which is variable in effective length during use.

DISCLOSURE OF THE INVENTION

It is an object of the present invention to provide an improved exhaust system suitable for certain internal combustion engines.

Accordingly, the invention provides an exhaust system for a four stroke internal combustion engine having at least one cylinder and at least one header pipe receiving exhaust gases from the at least one cylinder, the exhaust system comprising:

an exhaust chamber communicating with the at least one header pipe and an exit port, whereby exhaust gases flow from the at least one header pipe, through the exhaust chamber and to the exit port; and an inner member mounted at least partially within the exhaust chamber, said inner member movable in response to engine speed to vary the restriction provided to flow of gas through the exhaust chamber.

In the case of multi-cylinder four-stroke engines, which usually have a plurality of header pipes, the exhaust system of the invention preferably has a plurality of inner members adapted to fit with a plurality of the corresponding header pipes.

Preferably, the exhaust chamber has a centre portion and opposite portions, one being tapered, the exit port being located in the tapered end portion, and the or each header pipe leading into the exhaust port being located at the end position opposite the tapered end portion.

In a particularly preferred embodiment, there are four inner members located within the exhaust chamber.

Each inner member is adapted to be slidably received within or on an opposite header pipe. The inner members may further be joined together at a base. The inner members may be supported within the exhaust chamber by any suitable means and may be caused to move by a suitable servo-mechanism in response to engine speed.

In another embodiment of the invention, only one inner member is located within the exhaust chamber. The inner member of this embodiment may be similar in format to the inner member described above.

It is preferred that each inner member has one end shaped to fit a corresponding header pipe, while the other end echoes the shape of all or part of the tapered end portion of the exhaust chamber. The shape of the inner member(s) can be important as the relationship between the inner member(s) and the tapered end portion of the exhaust chamber provides the change in volume of the exhaust chamber aft of the inner member(s) during operation of the engine.

The inner member(s) may intervene with the gas path (as previously defined) in order to change the resistance to gas flow in response to engine speed. For example, the inner member(s) may be caused to move towards the header pipes by a servo-mechanism in response to increased engine speed, thus reducing the resistance of the exhaust chamber to gas flow.

When engine speed decreases, the inner member(s) may be caused to move away from the header pipes towards the exit port, thus increasing the resistance of the exhaust chamber to gas flow.

Such intervention enhances scavenging of the exhaust products from the cylinder by creating negative pressure at the exhaust port, particularly during valve overlap time.

This invention also provides an internal combustion engine having a cylinder, a piston movable therein, an exhaust port, a header pipe, an exhaust chamber and an exit port, an inner member located at least partially in the exhaust chamber and adapted to fit with the header pipe, a gas port defined in use by the header pipe, the inner member, and the exit port, characterised in that the inner 15 member is movable to change resistance of the exhaust chamber to gas flow during operation of the engine.

Where the engine is a four-stroke engine, there is preferably a plurality of the inner members which are adapted to vary the resistance of the exhaust chamber to gas flow so as to establish a negative pressure differential at the exhaust port during the exhaust stroke.

In another embodiment, the inner member is mounted downstream of the header pipes, preferably partially in the exit port, and its upstream end cooperates with the downstream end of the header pipes to vary the resistance to gas flow.

BRIEF DESCRIPTION OF THE DRAWING

By way or example only, some preferred embodiments of the present invention will now be described with reference to the accompanying drawings, wherein.

DETAILED DESCRIPTION OF THE DRAWING

Figure 1A:
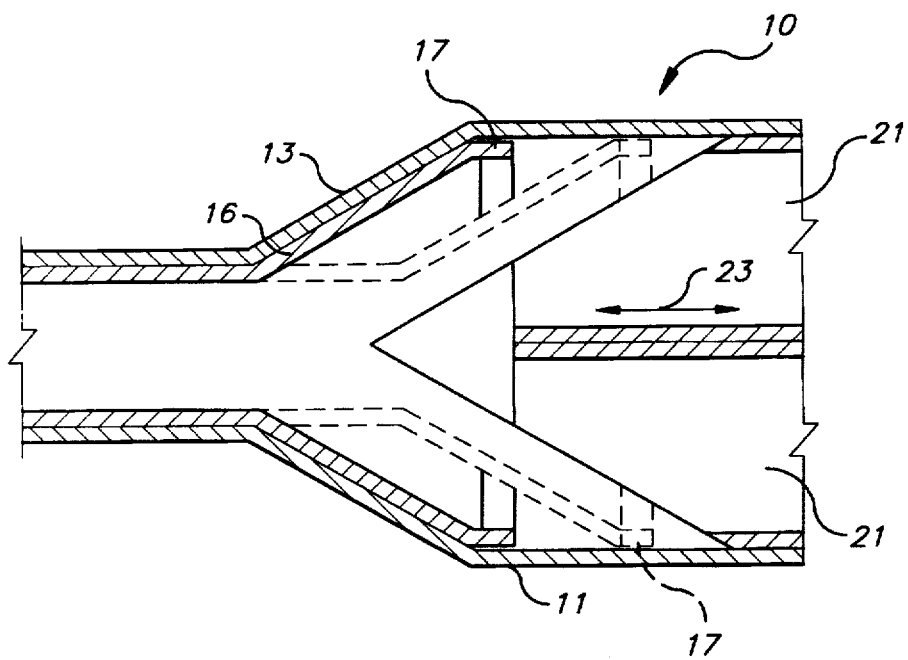
FIG. 1A is a sectional view of an embodiment of an exhaust system according to the invention suitable for a four-stroke engine.
Figure 1B:
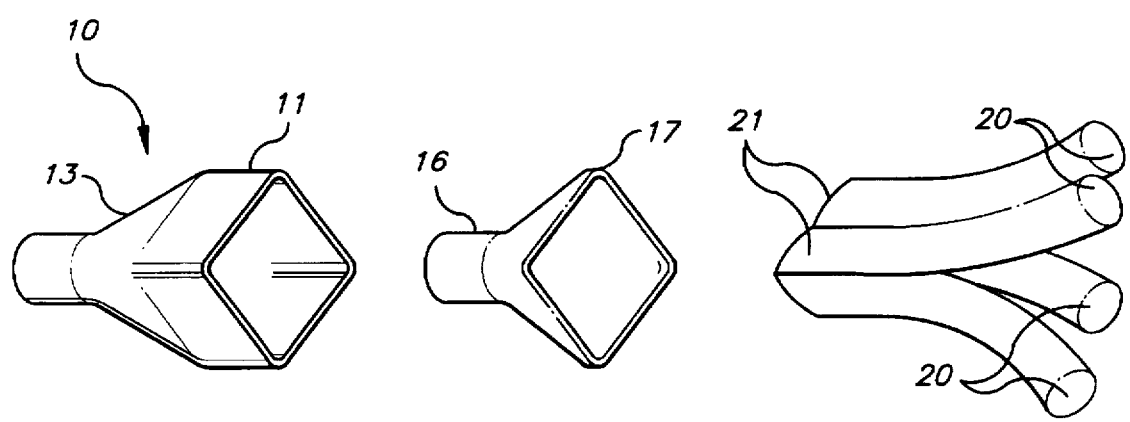
FIG. 1B is a partially exploded perspective view of the embodiment of FIG. 1A.

The exhaust system in FIGS. 1A and 1B is an embodiment of the invention which is particularly suitable in connection with four-stroke engines. The exhaust system of FIGS. 1A and 1B has exhaust chamber 10 having center portion 11 and tapered portion 13.

Located within tapered portion 13 of exhaust chamber 10 is inner member 16, provided in a shape of a pyramid (absent its base) and having projection 17, inner member 16 closely echoes the shape of tapered portion 13. Header pipes 20 protrude into center portion 11 at one end 21 thereof and communicate with exhaust port (not shown) at the other end.

Inner member 16 is supported within tapered portion 13 by any suitable means. Inner member 16 is caused to move by a suitable servo-mechanism (not shown) in the direction of arrow 23 in response to engine speed. Thus, when engine revolutions are high, inner member 16 will be located within tapered portion 13 as shown in FIG. 1A. As revolutions decrease, the inner member 16 will move towards the position shown in dotted outline in FIG. 1A.

Figure 2A:
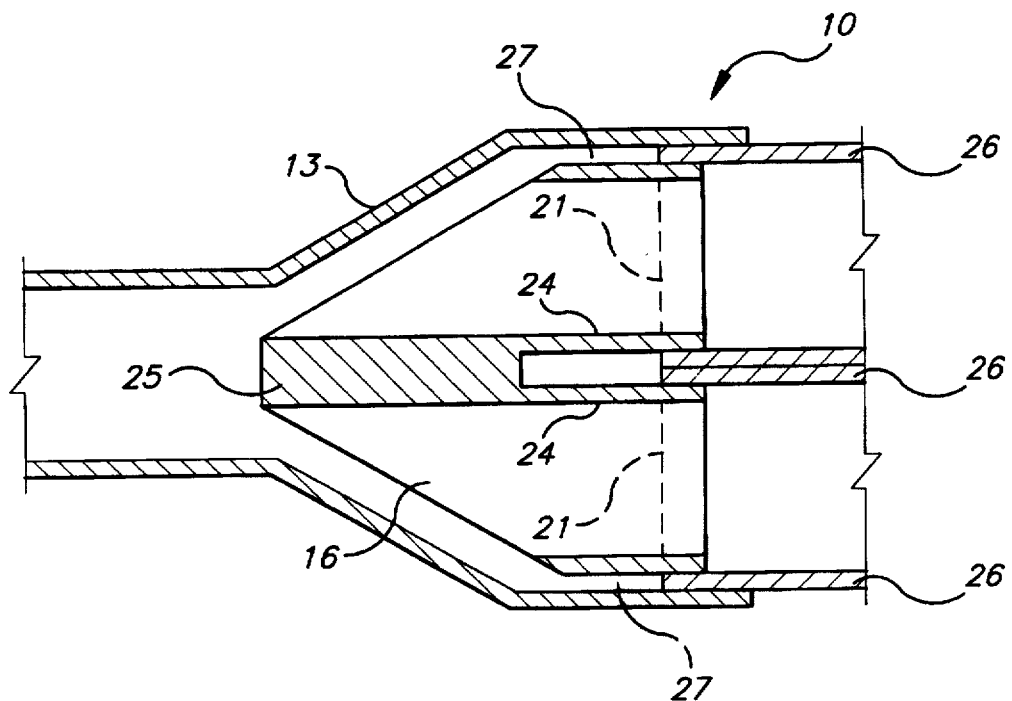
FIG. 2A is a sectional view of a second embodiment of an exhaust system according to the invention suitable for a four-stroke engine.
Figure 2B:
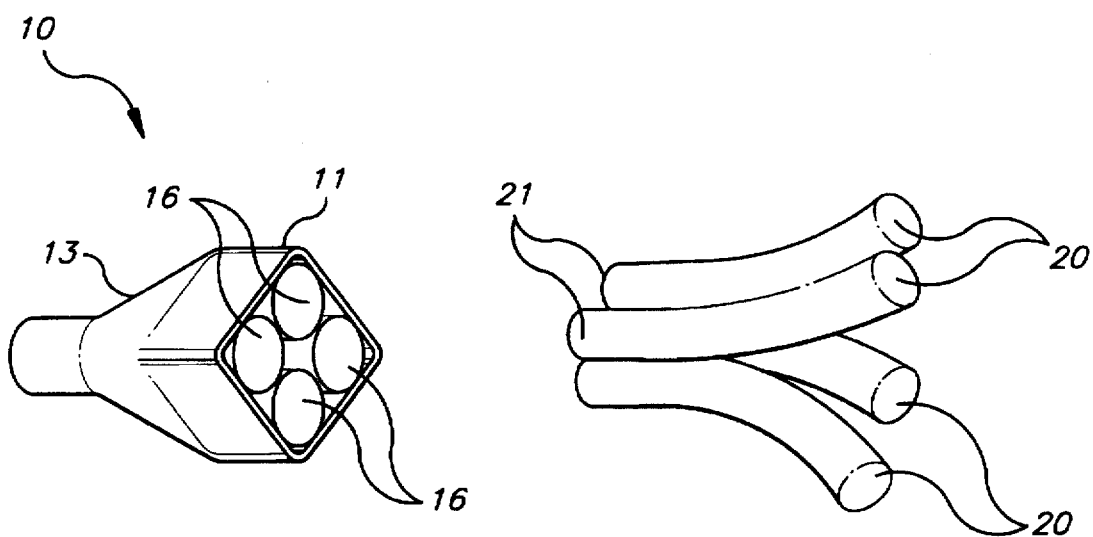
FIG. 2B is a partially exploded perspective view of the embodiment of FIG. 2A.

Referring to FIGS. 2A and 2B, the exhaust system according to the invention comprises exhaust chamber 20 having center portion 11 and tapered end portion 13. Tapered portion 13 communicates with an exit portion (not shown). Four header pipes 26 protrude into center portion 11 at one end 21 thereof and communicate with an exhaust port (not shown) at the other end.

Located within exhaust chamber 10 are four inner members 16 being joined together at base 24. Each inner member 16 is slidably received within opposite header pipe 20 at end 21 thereof.

Each inner member 16 has one end shaped to fit header pipe 20 while the other end echoes the shape of tapered end portion 13 of exhaust chamber 10.

As may be seen in FIG. 2A, wall 24 of inner member 16 can fit within wall 26 of header pipe 20. Gap 27 is provided between the group of inner members 16 and centre portion 11 so that wall 26 of corresponding header pipe 20 can fit into centre portion 11.

Inner members 16 are supported within exhaust chamber 10 by any suitable means and are caused to move there by a suitable servo-mechanism (not shown) in response to engine speed.

Inner members 16 operate to increase aft exhaust chamber volume 28 as engine speed increase, and allow volume 28 to reach maximum as engine speed decreases. For example, inner members 16 are caused to move towards pipes 20 and the exhaust port (not shown) by a servo-mechanism (not shown) in response to increased engine speed, thus increasing volume 38.

When engine speed decrease, inner members 16 are caused to move away from the exhaust port towards the exit port, thus reducing volume 13.

The exhaust systems illustrated in the drawings are capable of increasing engine power without adversely affecting scavenging.

It is to be understood that the embodiments described in connection with the drawings are for the purpose of illustrating the invention and are not to be interpreted as limiting in the scope of the invention. Other variations will be apparent to one skilled in the art and are within the scope of the invention.

I claim:

1. An exhaust system for a four-stroke internal combustion engine having at least one cylinder and at least one header pipe receiving exhaust gases from the at least one cylinder, the exhaust system comprising:

an exhaust chamber communicating with the at least one header pipe and an exit port;

a hollow inner member mounted at least partially within the exhaust chamber;

said inner member movable in response to engine speed to vary the restriction provided to flow of gas through the exhaust chamber;

said exhaust chamber has a first section and an intermediate section extending from the first section to the exit port and tapering in a downstream direction, and the inner member has a downstream end tapering in a downstream direction which cooperates with the intermediate section to vary the restriction to gas flow.

2. The exhaust system of claim 1 wherein the downstream end of the at least one header pipe extends into the exhaust chamber and the inner member is mounted for reciprocal movement on or in the downstream end.

3. The exhaust system of claim 1 wherein the engine has a plurality of cylinders and an equal plurality of header pipes.

4. An exhaust system for a four-stroke internal combustion engine having at least one cylinder and at least one header pipe receiving exhaust gases from the at least one cylinder, the exhaust system comprising:

an exhaust chamber communicating with the at least one header pipe and an exit port;

a hollow inner member mounted at least partially within the exhaust chamber;

said inner member movable in response to engine speed to vary the restriction provided to flow of gas through the exhaust chamber;

said inner member has an upstream section, and a downstream section of smaller cross-sectional area, the upstream end including a tapered upstream section adjacent the downstream section, the upstream end and the downstream end of the at least one header pipe cooperating to vary the restriction to gas flow.

5. The exhaust system of claim 4 wherein the inner member is mounted in the exit port.

6. The exhaust system of claim 4 wherein the engine has a plurality of cylinders and an equal plurality of header pipes.

7. An exhaust system for a four-stroke internal combustion engine having at least one cylinder and at least one header pipe receiving exhaust gases from the at least one cylinder, the exhaust system comprising:

an exhaust chamber communicating with the at least one header pipe and an exit port;

a hollow inner member mounted at least partially within the exhaust chamber;

said inner member movable in response to engine speed to vary the restriction provided to flow of gas through the exhaust chamber;

said inner member has an upstream section, and a downstream section of smaller cross-sectional area, the upstream end including a tapered upstream section adjacent the downstream section, the upstream end and the downstream end of the at least one header pipe cooperating to vary the restriction to gas flow;

said downstream end of the at least one header pipe is tapered to be complimentary to the upstream section.

* * * * *